2,890,215

PHOTOGRAPHIC GELATIN AND PROCESS OF PRODUCING SAME

Leo David Corben, Beverly, and Ernst Albert Steigmann, Stoneham, Mass., assignors to General Foods Corporation, White Plains, N.Y., a corporation of Delaware No Drawing. Application April 8, 1957
Serial No. 651,160

6 Claims. (Cl. 260—117)

The present invention relates to the field of photographic reproduction. More particularly it relates to a process for desensitizing photographic gelatin and to the product obtained by this treating process.

Gelatin has been used for many years as a film-forming colloid to support silver halides in photographic emulsions. It has long been recognized however, because of its natural origin, the variety and impurity of the raw materials from which it is prepared, and the various techniques used to extract the gelatin from the raw stock, that the final product gelatin is non-uniform. Furthermore, even when the composition of different batches is uniform, the gelatin contains various impurities which may render it photographically deficient if not totally unsuitable.

Typical of the impurities found in gelatin which are particularly undesirable from the photographic standpoint are various reducing agents such as reducing sugars, aldehydes, or sulfur-containing compounds such as cystine which has the formula $[SCH_2CH(NH_2)COOH]_2$, sulfurous acid, thiosulfates, and polythionates. Methionine is another undesirable component.

If these impurities are not removed from gelatin before the photographic emulsion is prepared, it is found that there may be wide variations in the uniformity of the emulsions prepared from different batches of gelatin. Furthermore, it is also found that presence of these impurities results in a high level of fogging, i.e., the emulsion blackens on developing in places where it has not been exposed. Other deficiencies of emulsions traceable to these impurities will be apparent to those skilled-in-the-art.

It will also be apparent to those skilled-in-the-art that many attempts have been made to elminate the undesirable effects of these impurities, typified by reducing substances and sulfur compounds, and to obtain an inert gelatin characterized by reproducible properties including freedom from fogging. Removal of these photographically active impurities has been tried by use of adsorbents such as active carbon and by ion exchange resins. Although some improvement is obtained, the so-treated gelatin must be further treated before it can be considered satisfactory.

Other treating materials which have been employed include free halogens, hypochlorites, permanganates, hydrogen peroxide, and sodium peroxide. Although some improvement is noted in each case, none of these, or any others, is completely satisfactory. Use of halogens or hypochlorites, for example, leaves large amounts of residual halides in the gelatin which lead to an unbalance of the emulsion formulation. Furthermore, these treating materials are not sufficiently active in amounts which can be tolerated by the gelatin without undesirable destruction or hardening. Permanganates, which have been tried, react with the gelatin, rather than with the impurities. Manganese ions introduced into the solution by this technique, in many instances reduces silver present in the emulsion with resultant fogging.

Hydrogen peroxide is not reliable in its action because its action depends on catalyzing metal traces and pH, each of which vary from batch to batch of gelatin. Even under the most favorable conditions, it is not powerful enough to give completely satisfactory results, the product gelatin having rather poorly defined characteristics.

Other techniques including treatment with sodium peroxide, electrodialysis; washing; etc. are each also characterized by particular defects which render them undesirable and the products of these techniques are not entirely satisfactory.

It is an object of this invention to prepare a gelatin characterized by its inertness. Other objects will be apparent to those skilled-in-the-art.

According to certain of its aspects, this invention comprises the treatment of gelatin with a peracid whereby the gelatin is rendered inert, i.e., free of undesirable impurities.

The gelatin treated according to this process will preferably be in the form of a gelatin solution, typically one which has been formed by extraction from the various precursors of gelatin. Alternatively, the technique herein disclosed may be applied to gelatin in the form of its precursor, i.e., the treatment may be applied to those materials from which gelatin is to be extracted. Typical of these gelatin stock materials are ossein, lime splits, pieces, or other raw materials commonly encountered in the gelatin industry. The term "gelatin," as used herein, is intended to include gelatin in the form of its precursor material (i.e. collagen) in situ in any one of the afore-mentioned stock materials as well as gelatin which has been extracted therefrom. The advantageous features of this invention are obtained regardless of whether the gelatin is treated before or after extraction.

Although this invention is primarily directed to a novel inert gelatin and the technique of producing the same, other substantial advantages accrue. Among these may be noted that the rate of extraction of gelatin from raw materials is considerably increased as a result of the techniques of this invention without any detrimental effect on the product properties.

The oxidizing peracids which may be used in connection with this invention are those acids which contain the maximum possible proportion of oxygen. When the peracid is an inorganic peracid, e.g., perchloric acid, $HClO_4$, it will contain the greatest amount of oxygen possible and the element from which it is formed will be at its customary maximum valence, viz., in the case of perchloric acid, the chlorine has a valence of seven. When the peracid is an organic acid, it will be characterized by the percarboxyl group —COOOH.

Typical of the acids which function according to this invention are perchloric acid, performic acid, and peracetic acid. Of the acids which can be used, peracetic acid, $CH_3COOOH$, is the preferred acid. Use of this acid permits attainment of a product which is eminently satisfactory. Peracetic acid is particularly suitable because acetic acid, its reaction product, is photographically indifferent or inert, and need not be removed from the gelatin emulsion. Use of this material gives an emulsion which is free of undesirable reducing and fogging properties; furthermore, this acid has substantially no effect on the important halide balance of the emulsion.

When the peracid is used to treat the raw materials from which gelatin may be extracted, those materials (e.g. ossein) may be in the dry state or admixed with water. Typically the ossein (which will customarily have previously been limed and washed) will be mixed with e.g. four times its weight of water. When the treatment is applied directly to gelatin, the gelatin will preferably be in the form of an aqueous solution having a concentration of e.g. 10% to 20%, say 20%.

In carrying out the process of this invention, the peracid may be added to the gelatin in amount considerably in excess of the amount which is stoichiometrically required to effect the inertization of the gelatin. Preferably this amount will be about 2%–8% by weight of the gelatin (dry basis). When gelatin charge stock such as ossein is employed, the 2%–8% peracid will be on the basis of dry ossein.

The amount of peracid required may be decreased to a much lower value e.g. to as low as one-fifth to one-tenth of these percentages if the gelatin or the stock has been given a precleansing treatment which in and of itself is inadequate to effect the desired results. (This amount is still a substantial excess of that required to effect the desired reaction.) Such a pretreatment may include treatment of gelatin solution with active carbon or ion exchange; or treatment of the raw stock with sulfurous acid. None of these pretreatments is adequate per se to effect the results obtained by the instant invention. When such a pretreatment is used, the gelatin may be rendered free of the undesirable impurities by treatment according to this invention with e.g. from about 0.05%–1% by weight of the peracid.

The percentages of acid used are based on the most concentrated forms of the acid available on the market. In the case of peracetic acid, this is the aqueous solution containing 40% by weight of the acid.

Although the pH of the solution during treatment with, e.g., peracetic acid may vary, it is preferred to operate at an acid pH, i.e., less than seven. When gelatin stock is used, the preferred pH is about 4.0 or less, typically 3.5. When gelatin is treated, preferably the pH will be in the range of 4.5–5.5. When alkali-type gelatins are treated, highly favorable results are obtained in the isoelectric region of about pH 4.7–5.1.

The treatment of the gelatin will continue for time sufficient to destroy the minutest traces of photographically active material. As is apparent to those skilled-in-the-art, the time and temperature of treatment will vary depending upon the particular gelatin or charge stock. The temperature, however, will preferably be 120° F.–140° F., and usually about 120° F. The gelatin and acid may be in contact, with appropriate agitation for, e.g., periods of time ranging from 15 minutes to 72 hours. When the treating is done on, e.g., ossein, preferred time may be 10–12 hours. When the gelatin being treated is in solution, the preferred time may be 15 minutes to 60 minutes.

Subsequent to treatment with the peracid, the gelatin will be treated with sulfurous acid or potassium metabisulfite, in amount of e.g., 1.5 to 3 parts of sulfurous acid or equivalent of the salt per 100 parts of gelatin on a dry basis, to remove or neutralize the excess unreacted peracetic acid which may be present. Preferably when the material being treated is gelatin per se, as distinguished from gelatin in the form of its precursor in charge stock, the so-treated gelatin will be de-anionized to remove sulfuric and acetic acid present formed by the reaction of the sulfurous acid with the peracetic acid.

Following the treatment herein noted, the stock may be extracted substantially in accordance with standard techniques; the so-treated gelatin may be further treated as desired to give, e.g., solid gelatin. The resultant gelatin product is whiter and more free of bacteriological impurities than gelatin customarily obtained.

It is significant to note that the product gelatin is substantially photographically inert. The photographically active impurities (e.g., cystine or other sulfur compounds, restrainers, aldehydes, or reducing substances) are reduced to a level which permits the gelatin to be called substantially inert.

Inertness (i.e., purity) may be tested by preparing a conventional silver bromiodide emulsion in a dilute solution of the gelatin under test. The microcrystalline precipitate is washed by sedimentation and decantation. The washed precipitate is resuspended in a concentrated solution of the test gelatin and diluted. pH is adjusted, and the emulsion is subjected to heat treatment (termed an after-ripening) for three hours at 60° C. Samples of the emulsion are taken at 30-minute intervals for test coatings which are exposed to a standard source and developed.

The net density is plotted against time of after-ripening to give a rate of sensitization. The amount of fogging is also plotted against time of after-ripening to give a rate of fog formation. These two curves are sufficient to characterize the practical photographic properties of a given gelatin. An inert gelatin gives a photographic emulsion which does not substantially increase in sensitivity or fog during after-ripening.

In order to illustrate specific embodiments of this invention and to compare this invention with prior art techniques, five 20% aqueous gelatin solutions were prepared and treated according to the following prior art procedures, in each case, the conditions being the standard conditions well-known to those skilled-in-the-art which permit attainment of the most inert product possible with that technique:

(1) Treatment with activated carbon;
(2) Treatment with hydrogen peroxide at pH 9.0 (alkaline);
(3) Treatment with hydrogen peroxide at pH 5.0 (acid);
(4) Treatment in a mixed bed ion exchange column;
(5) Treatment with bromine.
(6) A sixth experiment was conducted by washing solid gelatin with water for four hours.

The product of these examples was compared with a product obtained by the following examples wherein the treatment is in accordance with the instant invention:

*Example I*

One pound of ossein in three liters of water was treated with 2% by weight (9 grams) of 40% peracetic acid. The mixture was permitted to stand for 24 hours during which time glacial acetic acid was added periodically to maintain the pH at about 3.5. The solution was poured off, the stock rinsed twice with plain water and then covered with plain water to which 10 grams of potassium metabisulfite was added to remove the excess of peracetic acid. The ossein was drained and water washed.

The ossein was tested for undesirable impurities specifically by testing for cystine and aldehydes. The tests indicated that the ossein was substantially inert, i.e., contained substantially no cystine or aldehydes.

The so-treated ossein was limed and extracted according to standard techniques. The gelatin prepared by this extraction was also substantially inert.

*Example II*

100 pounds of dry gelatin was dissolved in water to form a 20% solution. 3 pounds of 40% peracetic acid were added to the gelatin solution, the mixture being maintained at 120° F. After reaction continued for 20 minutes at 120° F. and then 1.5 pounds of sulfur dioxide was passed through the solution. The resultant gelatin solution was rendered free of acid by deionization in an anion exchange column. The gelatin in solution was found to be substantially inert, i.e., free of photographically active material. The gelatin was specifically found to be free of aldehydes and photographically active sulfur.

Comparison of the six samples prepared by the above-noted prior art processes with the gelatin prepared by the instant process indicated the following:

Treatment with activated carbon produces a gelatin with a slightly lower tendency to fog (i.e., a lower fog index). The gelatin was obviously not inert.

Treatment with peroxide gives erratic results. At pH 9, the product still has some of the same fogging characteristics of the starting gelatin. This product and that obtained by treatment at pH 5 are both substantially inferior in fogging characteristics to applicants' novel product.

Treatment in the ion exchange column, like treatment by washing, improved the fogging tendency slightly.

Treatment with bromine destroyed much of the activity of the gelatin.

None of these treated gelatins was satisfactorily rendered inert.

On the other hand, the gelatin prepared by Examples I and II supra were substantially inert and free of fogging. Their photographic properties are eminently superior, by all tests, to any gelatin prepared by allegedly comparable processes. The rate of sensitization of applicants' gelatin is desirably lower than that of the other products.

It will be apparent to those skilled-in-the-art that various modifications may be made in the above disclosure which fall within the scope of this invention.

We claim:
1. The process of treating a gelatin containing photographically active impurities to render the gelatin photographically inert which comprises treating said gelatin with a peracid selected from the group consisting of peracetic acid, perchloric acid, and performic acid in amount at least equal to that stoichiometrically required to inertize the photographically active impurities in said gelatin.

2. The process of treating gelatin according to claim 1 wherein said peracid is peracetic acid.

3. The process of treating gelatin according to claim 1 wherein said peracid is perchloric acid.

4. The process of treating gelatin according to claim 1 wherein said peracid is performic acid.

5. The process of treating a gelatin containing photographically active impurities to render the gelatin photographically inert which comprises treating said gelatin with an excess of a peracid selected from the group consisting of peracetic acid, perchloric acid, and performic acid, maintaining said acid in contact with said gelatin until said gelatin is rendered inert, and neutralzing the said excess of acid.

6. A photographic gelatin characterized by substantially complete inertness prepared by treating a gelatin containing photographically active impurities with a peracid selected from the group consisting of perchloric acid, peracetic acid and performic acid in amount at least equal to that stoichiometrically required to inertize the photographically active impurities in said gelatin.

References Cited in the file of this patent

UNITED STATES PATENTS

| | | |
|---|---|---|
| 1,575,348 | Luscher | Mar. 2, 1926 |
| 1,898,512 | Wendt | Feb. 21, 1933 |
| 2,743,265 | Garono et al. | Apr. 24, 1956 |